United States Patent [19]

Crook

[11] 4,193,709
[45] Mar. 18, 1980

[54] TUBE END FIXTURES
[75] Inventor: Roger L. Crook, Andover, England
[73] Assignee: Martin-Thomas Limited, South Way, England
[21] Appl. No.: 909,408
[22] Filed: May 25, 1978
[30] Foreign Application Priority Data
 Jun. 2, 1977 [GB] United Kingdom ............ 23412/77
[51] Int. Cl.² .............................................. F16B 7/00
[52] U.S. Cl. .................................... 403/191; 403/233
[58] Field of Search ............... 403/237, 235, 234, 191, 403/233, 236, 49

[56] References Cited
U.S. PATENT DOCUMENTS

| | | | |
|---|---|---|---|
| 1,963,981 | 6/1934 | Garrett | 403/237 X |
| 2,665,950 | 1/1954 | Johnson | 403/49 X |
| 2,990,203 | 6/1961 | Grover et al. | 403/191 X |
| 3,490,063 | 1/1970 | Romney | 403/235 |

FOREIGN PATENT DOCUMENTS 1118050  3/1956  France ..................... 403/233

Primary Examiner—Andrew V. Kundrat
Attorney, Agent, or Firm—William A. Drucker

[57] ABSTRACT

The tube end fixture is formed with an eye or a tongue integral with the shank of circular shape, the whole being formed as a section of an extrusion. The extrusion in a long length is cut off at intervals to form the desired fixtures. By this means it is possible to use the same alloy for the fixtures as for the tubes which is not possible when the fixtures are castings.

The fixtures and tubes are welded together to form frames for staging.

6 Claims, 6 Drawing Figures

TUBE END FIXTURES

BACKGROUND OF THE INVENTION

1. Field of the Invention

This invention relates to end fixtures for structural members such as tubes. The main object of the invention is to connect members to tubes by means which are advantageous for reliable connection and which provide improved large scale production. An example of such tubes and fixtures is as used in the construction of frames for prefabricated aluminium stagings.

2. Description of the Prior Art

Examples are shown and described in the specification of British Patent No. 1396602. The fixtures may be in the form of hooks or eyes. These fixtures are made with a shank which fits more or less loosely into the ends of a tube. Such fixtures and tubes have been made in which the fixtures are castings and the tubes are extrusions.

Fixtures have been made for example by casting, forging and forming.

SUMMARY OF THE INVENTION

According to the present invention the fixture has an eye or tongue integral with a shank of generally circular shape formed as a section of an extrusion. An extrusion in a long length is cut off at intervals to form the desired fixtures. For round tubes the shanks are then machined to fit the tubes. By this means it is possible to use the same alloy for the fixtures as for the tubes which is not possible when the fixtures are castings. The extrusions therefore lend themselves to better welding and avoid faults such as blowholes which sometimes occur in castings.

The extrusions can include flat lands for precise location in the welding or other machine.

The extrusions may also include ribs which can serve for location or feeding in a sawing machine.

BRIEF DESCRIPTION OF THE DRAWINGS

Constructional forms of the invention are illustrated by way of example in the accompanying drawings wherein.

DESCRIPTION OF THE PREFERRED EMBODIMENT

Figure 1:
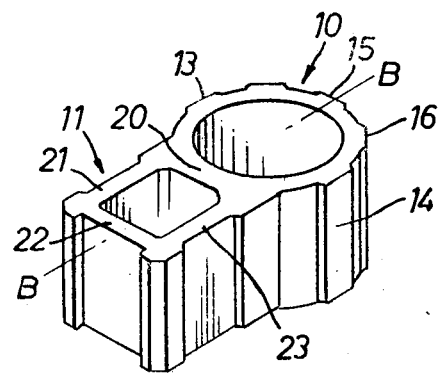
FIG. 1 is a perspective view of a fixture made in accordance with the invention.

The fixture shown in FIG. 1 comprises an eye 10 which in this example has a circular interior shape to receive a tube of the same diameter. The eye is formed with extruded flat lands 13, 14 on diametrically opposite sides and an end flat land 15 at right angles to the lands 13, 14. These serve to locate the fixture square in the welding machine and machining apparatus. Flat lands such as 16 may be provided in other portions if required. The eye is integral with a shank 11 which as extruded has a generally rectangular (e.g. square) shape. The shank has four walls 20, 21, 22, 23 which provides considerable strength. The eye and shank are symmetrical about a central plane B-B. The fixture is made by extruding a length of material and sawing this into short lengths each as shown. The shank is formed with grooves at the sides of its four corners to provide locating or guide surfaces for the sawing operation.

Figure 2:
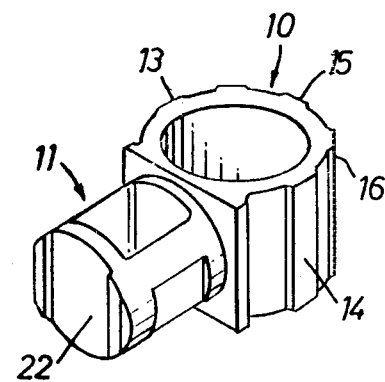
FIG. 2 is a perspective view of a modified form of this fixture.

For the purpose of the present invention the square shape is machined to circular shape as shown in FIG. 2 with the axis of the circular shape at right angles to the axis of the eye 10. The fixture will be connected by welding, adhesive or other means to the tubes.

Figure 3:
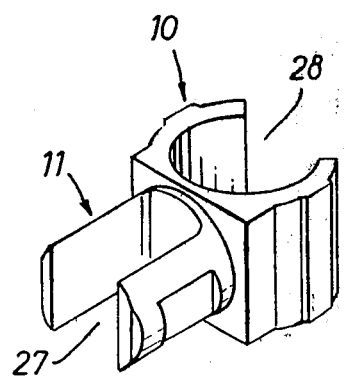
FIG. 3 is a similar view showing a further modification.

FIG. 3 shows a modification of the extrusion having gaps 27, 28 and machined to suit round tubes.

Figure 4:
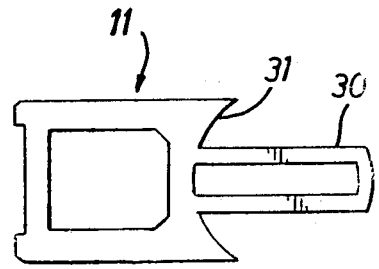
FIG. 4 is a plan view showing another form of the invention.

FIG. 4 shows a modified form of fixture in which the eye is replaced a narrow tongue 30 to enter a slot in the wall of a tube while the adjacent surfaces 31 are shaped to correspond to the slotted tube.

Figure 5:
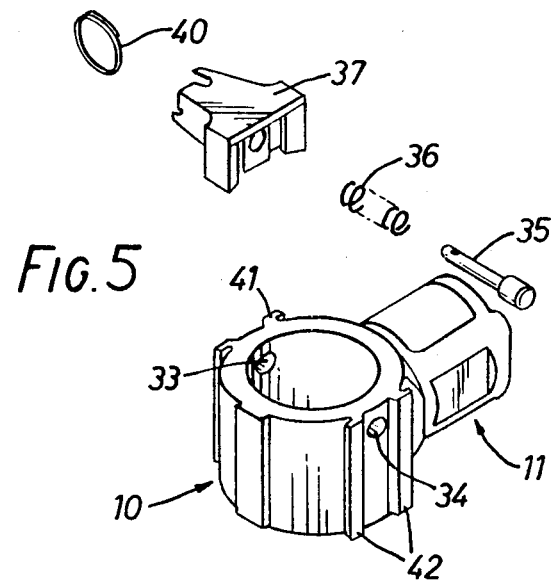
FIG. 5 is a perspective exploded view of another form of the fixture.
Figure 6:
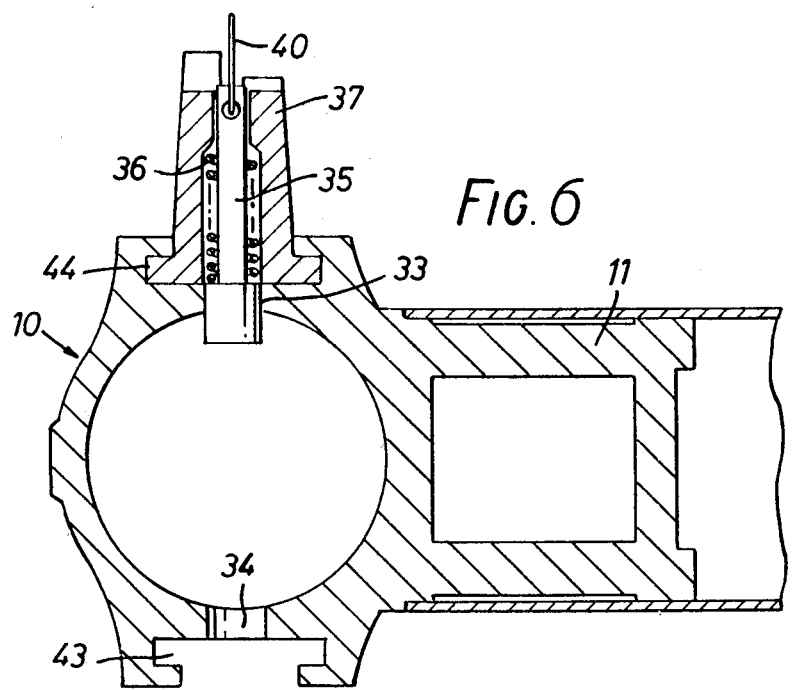
FIG. 6 is a sectional view of a modified form of the fixture shown in FIG. 5.

FIGS. 5 and 6 show a mechanical arrangement for connection of a member to the fixture in a detachable manner. The eye is formed with holes 33, 34 engageable by a pin 35 which is urged by a spring 36 to keep one end of the pin in engagement with one of the holes and in engagement with a hole in the detachable member. The pin and spring are arranged in a housing 37 and the other end of the pin carries a ring 40 by which the pin may be disengaged when required. The fixture shown in FIG. 5 is provided with extruded ribs 41, 42 forming internal dovetail grooves to receive corresponding ribs on the casing 37. The fixture serves for right and left hand connections and thus avoids the hitherto necessity for providing two different forms of fixtures.

In FIG. 6 the dovetail grooves 43, 44 are internal instead of external as in FIG. 5.

The fixture may be adapted for example for fixing one tube above another in alignment to allow for joining frames attachably one upon another. For this purpose the eye can if desired be made large enough to allow for machining the inner surface to a conical shape. The fixture may also be adapted for fixing several tubes at right angles or other angles to a central tube i.e. with a fixture having two or more shanks 11, or for fixing a leg or foot at the lower end of a staging.

I claim:

1. A fixture comprising
   (a) a first tube engaging portion, and
   (b) a second tube engaging portion in the form of a shank integral with said first tube engaging portion
   (c) said first tube engaging portion and said shank are formed together as a section of an extrusion
   (d) and said shank is of generally circular shape formed by machining a rectangular extruded shape, the axis of the circular shank being at right angles to the axis of the first tube engaging portion.

2. A fixture according to claim 1 wherein the first tube engaging portion is an eye the axis of which is in the extrusion direction.

3. A fixture according to claim 1, wherein first tube engaging portion is an eye the axis of which is in the extrusion direction and the eye is formed with a plurality of extruded grooves spaced apart by flat lands parallel to the eye axis.

4. A fixture according to claim 1, wherein the first tube engaging portion is a narrow tongue, the tongue being coaxial with said circular shape.

5. A fixture according to claim 1, wherein the first tube engaging portion is an eye the axis of which is in the extrusion direction and the eye has exterior ribs for sliding attachment thereto of another member.

6. The combination of a fixture according to claim 1 and another member, wherein the first tube engaging portion is an eye the axis of which is in the extrusion direction and the eye is provided with exterior ribs for sliding attachment thereto of said member, and a spring pressed pin is provided in said member engageable in a hole formed in said eye.

* * * * *